(12) United States Patent
Namgoong et al.

(10) Patent No.: US 9,662,585 B2
(45) Date of Patent: May 30, 2017

(54) SERVER, METHOD, TERMINAL, AND RECORDING MEDIUM FOR PROVIDING GAME

(75) Inventors: Yoon Namgoong, Seoul (KR); Seung Cheol Kang, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 442 days.

(21) Appl. No.: 14/343,988

(22) PCT Filed: Jan. 13, 2012

(86) PCT No.: PCT/KR2012/000331
§ 371 (c)(1),
(2), (4) Date: Jul. 1, 2014

(87) PCT Pub. No.: WO2013/035945
PCT Pub. Date: Mar. 14, 2013

(65) Prior Publication Data
US 2014/0349765 A1    Nov. 27, 2014

(30) Foreign Application Priority Data

Sep. 8, 2011    (KR) ........................ 10-2011-0091002

(51) Int. Cl.
*A63F 13/20*    (2014.01)
*A63F 13/69*    (2014.01)
*G06F 17/30*    (2006.01)
*G07F 17/32*    (2006.01)
*A63F 13/35*    (2014.01)
(Continued)

(52) U.S. Cl.
CPC .............. *A63F 13/69* (2014.09); *A63F 13/35* (2014.09); *A63F 13/58* (2014.09); *G06F 17/30371* (2013.01); *G07F 17/3225* (2013.01); *A63F 13/822* (2014.09); *A63F 2300/5553* (2013.01);
(Continued)

(58) Field of Classification Search
CPC .......... A63F 13/12; A63F 13/35; A63F 13/69; A63F 2300/5526
See application file for complete search history.

(56) References Cited

U.S. PATENT DOCUMENTS 8,262,468 B1 * 9/2012 Vanbragt ............... H04W 4/206
  463/25
8,905,849 B1 * 12/2014 Coppersmith, III .... A63F 13/65
  463/1

(Continued)

FOREIGN PATENT DOCUMENTS

KR    100635194 B1    10/2006
KR    20060123694 A    12/2006
(Continued)

OTHER PUBLICATIONS

"Secondary CBT Experiences About Koei of the Three Kingdoms Online", Paran Blog, Apr. 27, 2008, 9 pages.
(Continued)

*Primary Examiner* — James S McClellan
*Assistant Examiner* — Kevin Carter

(57) ABSTRACT

The present invention relates to a game technology. More particularly, the present invention relates to a game server, a game method, a terminal, and a recording medium which provide a function of transferring attribute information of one character to another character in the game.

14 Claims, 14 Drawing Sheets

(51) Int. Cl.
*A63F 13/58* (2014.01)
*A63F 13/822* (2014.01)

(52) U.S. Cl.
CPC ..... *A63F 2300/575* (2013.01); *A63F 2300/65* (2013.01)

(56) References Cited

U.S. PATENT DOCUMENTS

| | | | | |
|---|---|---|---|---|
| 2004/0162136 | A1* | 8/2004 | Yamato | A63F 13/10 463/29 |
| 2006/0028475 | A1* | 2/2006 | Tobias | A63F 13/12 345/473 |
| 2006/0128471 | A1* | 6/2006 | Willis | A63F 13/10 463/42 |
| 2007/0082720 | A1* | 4/2007 | Bradbury | A63F 13/02 463/9 |
| 2009/0318234 | A1* | 12/2009 | Christensen | A63F 13/10 463/42 |
| 2010/0022301 | A1* | 1/2010 | Carpenter | A63F 13/12 463/30 |
| 2010/0210364 | A1* | 8/2010 | York | A63F 13/10 463/43 |
| 2011/0263324 | A1* | 10/2011 | Ganetakos | A63F 13/12 463/31 |

FOREIGN PATENT DOCUMENTS

| | | |
|---|---|---|
| KR | 100711309 B1 | 4/2007 |
| KR | 20080019910 A | 3/2008 |

OTHER PUBLICATIONS

English language translation of International Search Report issued in corresponding PCT Application No. PCT/KR2012/000331 on Sep. 14, 2012, 2 pages.
English language translation of International Preliminary Report on Patentability issued in corresponding PCT Application No. PCT/KR2012/000331 on Mar. 12, 2014, 9 pages.
English Abstract for "Secondary CBT Experiences About Koei of the Three Kingdoms Online", Paran Blog, Apr. 27, 2008, 1 page.

* cited by examiner

FIG. 4

| Character | Character attribute information | | | | | | |
|---|---|---|---|---|---|---|---|
| | Name | Experience value | Level | Stat | Generation time | Level at the time of generation | Stat at the time of generation |
| A1 | Freedel | 10 | 76 | 600 | 2020.08.12 | 1 | 300 |
| A2 | Raphael | 0 | 101 | 700 | 2020.08.12 | 26 | 400 |
| A3 | Vidichi | 0 | 51 | 500 | 2020.08.12 | 1 | 300 |

| First character attribute information | |
|---|---|
| Name | Vidichi |
| Experience value | 0 |
| Level | 51 |
| Stat | 500 |
| Generation time | 2020.08.12 |
| Level at the time of generation | 1 |
| Stat at the time of generation | 300 |

720

| Stat section | 100% experience value | 70% experience value | 50% experience value |
|---|---|---|---|
| 300-349 | 650 | 455 | 325 |
| 350-399 | 700 | 490 | 350 |
| 400-449 | 750 | 525 | 375 |
| 450-499 | 800 | 560 | 400 |
| 500-549 | 850 | 595 | 425 |
| 550-599 | 900 | 630 | 450 |
| 600-649 | 950 | 665 | 475 |
| 650-699 | 1,000 | 700 | 500 |
| 700-749 | 1,050 | 735 | 525 |
| 750-799 | 1,100 | 770 | 550 |
| 800-849 | 1,150 | 805 | 575 |
| 850-899 | 1,200 | 840 | 600 |
| 900-949 | 1,250 | 875 | 625 |
| 950-999 | 1,300 | 910 | 650 |
| 1000-1049 | 1,350 | 945 | 675 |
| 1050-1099 | 1,400 | 980 | 700 |
| 1100-1149 | 1,450 | 1,015 | 725 |
| 1150-1199 | 1,500 | 1,050 | 750 |

730

| Transfer character attribute information | |
|---|---|
| Accumulated experience value | 18.750 |

FIG. 10

| | level 76 | level 77 | level 78 | .... | level 92 | level 93 |
|---|---|---|---|---|---|---|
| | 950 | 960 | 970 | .... | 1110 | 1120 |

1020

| Second character attribute information | |
|---|---|
| Name | Vidichi |
| Experience value | 0 |
| Level | 51 |
| Stat | 500 |
| Generation time | 2020.08.12 |
| Level at the time of generation | 1 |
| Stat at the time of generation | 300 |

1010

| Converted transfer character attribute information | |
|---|---|
| Increasing level | 18 |
| Extra experience value | 120 |

1030

| Second character attribute information | |
|---|---|
| Name | Freedel |
| Experience value | 130 |
| Level | 94 |
| Stat | 750 |
| Generation time | 2020.08.12 |
| Level at the time of generation | 1 |
| Stat at the time of generation | 300 |

1040

SERVER, METHOD, TERMINAL, AND RECORDING MEDIUM FOR PROVIDING GAME

CROSS REFERENCE TO RELATED APPLICATIONS

This application is a 35 U.S.C. §371 National Phase Entry Application from PCT/KR2012/000331, filed Jan. 13, 2012, and designating the United States, which claims priority under 35 U.S.C. §119 to Korean Patent Application No. 10-2011-0091002 filed Sep. 8, 2011, which is incorporated herein in its entirety.

TECHNICAL FIELD

The present invention relates to a game technology. More particularly, the present invention relates to a server, a method, a terminal, and a recording medium for providing a game which provide a function of transferring attribute information of one character to another character in the game.

BACKGROUND ART

Among the recent games, the type of games attracting a user's interest through a process of making characters appear and the characters grow, such as a role playing game, a sports game, and the like, have been released.

For example, the role playing game is a game which forms character personality through role playing and solves the problem and the sports game is a game which borrows a sports form existing offline as it is and uses one or a plurality of characters. The recent sports game includes a function of managing a history of a player and improving ability of the player in the game by utilizing a character growing concept of the role playing game.

From the using pattern of users on games using the character, it may be appreciated that the user spends a lot of times, efforts, and costs to manage and grow the character. Nevertheless, the user may release or dissipates characters due to tediousness of the use of the existing characters with the passage of time, a burden of holding cost of the characters, and the like. However, the existing games do not have a function of compensating for efforts and costs of the user against the dissipation of the characters.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to more inspire a user's interest in a game by providing a function of transferring character attribute information of one character, which is grown in the game by a user, to another character.

Technical Solution

An exemplary embodiment of the present invention provides a game server, including: a character releasing unit configured to extract character attribute information on a first character stored from a database, generate transfer character attribute information based on the extracted character attribute information on the first character, and delete first character related information stored in the database, including the character attribute information on the first character, in accordance with transfer releasing request information; and a character attribute information transferring unit configured to update character attribute information on a second character stored in the database by referring to the transfer character attribute information, in accordance with attribute transfer request information.

Another exemplary embodiment of the present invention provides a game server including: a character attribute information extracting unit configured to extract character attribute information on a first character from a database; a transfer character attribute information generating unit configured to generate transfer character attribute information based on the extracted character attribute information on the first character; and a character attribute information updating unit configured to update character attribute information on a second character in the database by referring to the transfer character attribute information.

Another exemplary embodiment of the present invention provides a method for providing a game by a server, including: extracting character attribute information on a first character from a database; generating transfer character attribute information based on the extracted character attribute information on the first character; and updating character attribute information on a second character in the database by referring to the transfer character attribute information.

Another exemplary embodiment of the present invention provides a method for providing a game by a server, including: confirming character attribute information on a first character among holding characters; and updating character attribute information on a second character among the holding characters based on the confirmed character attribute information on the first character.

Another exemplary embodiment of the present invention provides a terminal, including: a character attribute information extraction controlling unit configured to perform a control to extract a character attribute information on a first character; a transfer character attribute information generation controlling unit configured to perform a control to generate transfer character attribute information based on the extracted character attribute information on the first character; and a character attribute information update controlling unit configured to perform a control to update character attribute information on a second character by referring to the transfer character attribute information.

Another exemplary embodiment of the present invention provides a method for providing a game by a terminal, including: performing a control to extract character attribute information on a first character; performing a control to generate transfer character attribute information based on the extracted character attribute information on the first character; and performing a control to update character attribute information on a second character by referring to the transfer character attribute information.

Another exemplary embodiment of the present invention provides a computer readable recording medium recorded with a program for executing a method for providing a game, in which the program implements a function of performing a control to extract character attribute information on a first character, a function of performing a control to generate transfer character attribute information based on the extracted character attribute information on the first character, and a function of performing a control to update character attribute information on a second character by referring to the transfer character attribute information.

Advantageous Effects

As set forth above, according to the exemplary embodiments of the present invention, it is possible to more inspire the user's interest in game by providing the function of transferring character attribute information of one character, which is grown in the game by the user, to another character.

DESCRIPTION OF THE DRAWINGS

FIG. 4 is a diagram for describing character attribute information on characters in the game according to an exemplary embodiment of the present invention.

FIG. 7 is a diagram illustrating an example of data for describing the process of FIG. 6.

FIG. 10 is a diagram illustrating an example of data for describing the process of FIG. 9.

MODE FOR INVENTION

Figure 1:
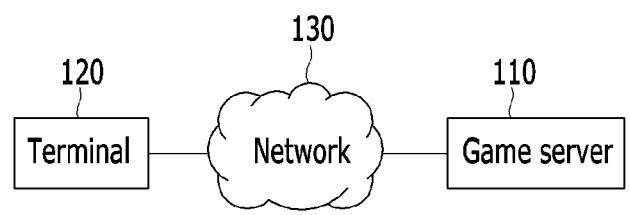
FIG. 1 is a block diagram schematically illustrating a game system according to an exemplary embodiment of the present invention.

Hereinafter, some exemplary embodiments in the present specification will be described in detail with reference to the illustrative drawings. In adding reference numerals to components of each drawing, even though the same components are illustrated in different drawings, it is to be noted that these components are denoted by the same reference numerals if possible. In describing exemplary embodiments of the present invention, well-known functions or constructions will not be described in detail since they may unnecessarily obscure the understanding of the present invention.

In addition, in describing components of the present specification, terms such as first, second, A, B, (a), and (b) may be used. These terms are used only to differentiate the components from other components, but the nature, sequence, order, etc. of the corresponding components are not limited by these terms. When a component is "connected", "coupled", or "linked" to another component, it is to be noted that the component may be directly connected or linked to the another component, but the component may be "connected", "coupled", or "linked" to the another component via another component therebetween.

FIG. 1 is a block diagram schematically illustrating a game system according to an exemplary embodiment of the present invention.

As illustrated in FIG. 1, a game system according to an exemplary embodiment of the present invention is configured to include terminals 120 in which a user actually plays a game, a game server 110 providing game-related application data or controlling a game so that the game may be played in the terminals 120, and a network 130 connecting the terminals 120 and the game server 110.

Herein, the game may include, for example, an arcade game, a strategy simulation game, a role playing game, a sports game, or the like but is not limited thereto and therefore may include all the kinds of games in which character attribute information (for example, experience value, ability value, level, and the like) of characters held by a user varies while the user plays a game using characters.

The above-mentioned game server 110 is connected to the terminals 120 and may provide pages on the corresponding web site to the connected terminals 120. Further, the game server 110 may perform a membership procedure, store and manage various types of information of users joined as a member, and provide a function of purchasing and settling various types of game related items (for example, characters, apparatuses, function items, and the like).

Further, the game server 110 may also relay execution data of the game applications executed by each of the terminals 120 in real time so as to allow users to execute a game battle.

Considering a hardware construction, the game server 110 has the same configuration as a general web server or WAP server. However, considering a software construction, the game server 110 includes a program module which is implemented by other languages such as C, C++, Java, Visual Basic, and Visual C and executes various functions.

Further, the game server 110 means a computer system which is generally connected to a plurality of unspecified clients (including the terminals 120) and/or other servers via an opened computer network 130 such as the Internet, receives a job execution request from clients or other web servers, and derives and provides job results therefor, and computer software (server program) installed therefor.

Further, in addition to the above-mentioned server programs, the game server 110 is to be understood as a broad concept including a series of application programs executed on the game server 110 and in some cases, various types of databases (hereinafter, referred to as DB) which is constructed inside or outside. Therefore, the game server 110 classifies the membership information and various types of information and data on games for each kind of games and stores and manages the classified information and data in the DB, in which the DB may be implemented inside or outside the game server 110.

Further, the game server 110 may be implemented using the server programs, which are variously provided depending on operating systems such as DOS, Windows, Linux, UNIX, and Macintosh in general hardware for the server, and the representative server programs may include a website and an Internet information server (IIS) used in the windows environment and CERN, NCSA, APPACH, etc., used in the UNIX environment, and the like.

Further, the game server 110 may be linked with an authentication system and a settlement system for user authentication of a game user or purchase and settlement of items in a game, etc.

The terminal 120 connected with the game server 110 via the network 130 is generally a personal PC, but any terminal may be used so long as the terminal 120 is connected to the wired and wireless based network 130 and may perform server-client communication with the game server 110, and the terminal 120 is a broad concept including all the communication computing devices such as a smart phone, a laptop computer, a mobile communication terminal, a personal digital assistant (PDA), and a game machine.

The network 130 is a network which connects the game server 110 to the terminals 120 and may be a closed network such as a local area network (LAN) and a wide area network (WAN), but is preferably an opened network such as Internet. The Internet means a universal opened computer network architecture which provides a TCP/IP protocol and several services existing on the upper layer, that is, a HyperText transfer protocol (HTTP), Telnet, a file transfer protocol (FTP), a domain name system (DNS), a simple mail transfer protocol (SMTP), a simple network management protocol (SNMP), a network file service (NFS), and a network information service (NIS). Further, when the terminal 120 is a mobile communication terminal, a smart phone, or the like, the network 130 may include a mobile communication network.

Figure 2:
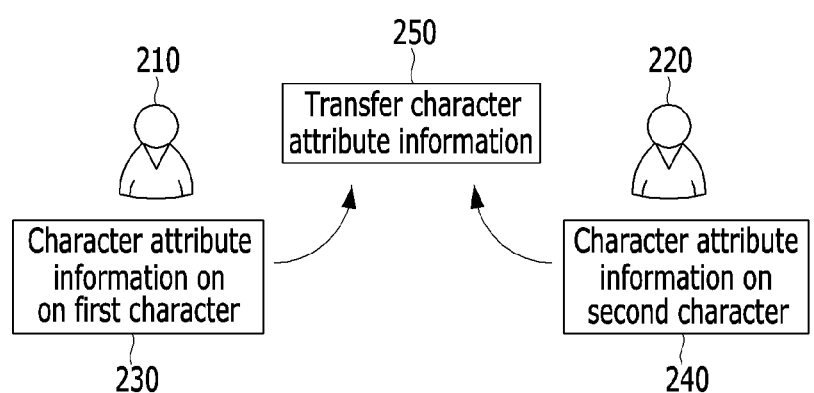
FIG. 2 is a diagram for describing a process of transferring character attribute information on a first character to a second character, in a game according to an exemplary embodiment of the present invention.

FIG. 2 is a diagram for describing a process of transferring character attribute information 230 on a first character 210 to a second character 220, in a game according to an exemplary embodiment of the present invention.

Referring to FIG. 2, transfer character attribute information 250 is generated by extracting the character attribute information 230 on the first character 210, and character attribute information 240 on the second character 220 is changed by using the generated transfer character attribute information 250.

In this case, the transfer character attribute information 250 may be converted from the character attribute information 230 on the first character or may be calculated or obtained based on a predetermined scheme using the character attribute information 230 on the first character, and the character attribute information 240 on the second character may be changed (for example: increase) and updated using the transfer character attribute information 250.

The transfer character attribute information 250 may be the same type (same attribute item) of information as the character attribute information 230 on the first character and may be the different type of information. For example, the transfer character attribute information 250 as the different type of information may include only some items of the character attribute information 230 on the first character. In detail, the attribute information (condition, mental state, and the like) which is not grown depending on the game execution by a user may be present in the character attribute information 230 on the first character, but may not be present in the transfer character attribute information 250. As another example of the different type of information, attribute items may have the same meaning but may be differently represented. In detail, the game may configured in such a manner that in the character attribute information 230 on the first character, an experience value item and a level item are separately managed, the level increases when a predetermined experience value is reached, but unlike this, in the transfer character attribute information 250, the experience value item and the level item are not separated and the information (experience values and levels) may be indicated as an attribute item called a total accumulated experience value.

The transfer character attribute information 250 and the character attribute information 240 on the second character have a reverse relationship of the character attribute information 230 on the first character and the transfer character attribute information 250, and therefore for the same reason, the type of information may be the same and different.

The character attribute information 230 on the first character and the character attribute information 240 on the second character may be the same type (same attribute item) of information and may be the different type of information. For example, only the items of the transferable character attribute information may be the same and the other attribute items may be different. Further, a transfer process is performed only in a uni-direction and thus the character attribute information on the first character 210 and the character attribute information on the second character 220 may be different from each other, and a process of transferring the character attribute information from the first character 210 to the second character 220 and a process of transferring the character attribute information from the second character 220 to the first character 210 are different from each other and thus the character attribute information 230 on the first character and the character attribute information 240 on the second character may become different from each other.

The exemplary embodiment of the present invention, which is illustrated in FIG. 2, is possible in the case in which the user holds a plurality of characters 210 and 220 within a game. However, the second character 220 may be present and may not be present when the transfer character attribute information 250 is generated based on the character attribute information 230 on the first character, and the second character 220 may be a character held by the user after the transfer character attribute information 250 is generated.

Hereinafter, the above-mentioned game server 110 will be described in detail with reference to FIG. 3. In particular, the game server 110 will be described in detail in connection with providing a function of transferring character attribute information.

Figure 3:
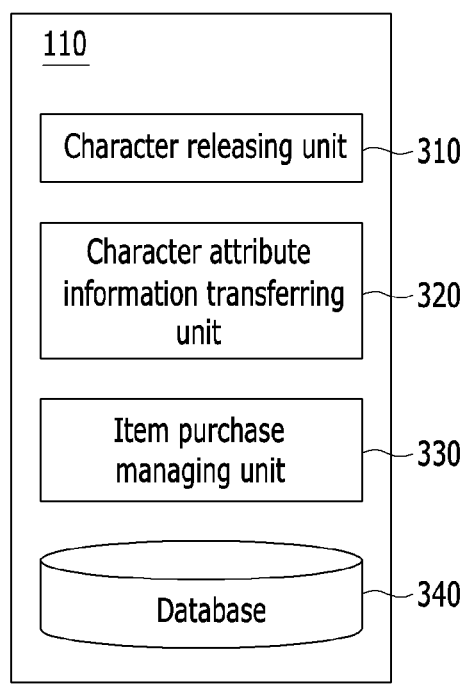
FIG. 3 is a block diagram of a game server according to an exemplary embodiment of the present invention.

FIG. 3 is a block diagram of a game server according to an exemplary embodiment of the present invention.

As illustrated in FIG. 3, the game server 110 for providing the function of transferring character attribute information in the game according to the exemplary embodiment of the present invention may include: a character releasing unit 310 which extracts the character attribute information 230 on the first character stored from a database, generates the transfer character attribute information 250 based on the extracted character attribute information 230 on the first character, and deletes first character related information stored in the database, including the character attribute information 230 on the first character, in accordance with transfer releasing request information; a character attribute information transferring unit 320 which updates the character attribute information 240 on the second character stored in the database by referring to the transfer character attribute information 250, in accordance with attribute transfer request information; an item purchase managing unit 330 which performs a process of purchasing a character attribute information extraction item when it is confirmed that the user does not yet hold the character attribute information extraction item and updates holding information on the character attribute information extraction item in response to the purchase result; and a database 340 which stores the character attribute information, and the like.

In the game server 110 according to the exemplary embodiment of the present invention, is illustrated in FIG. 3, the item purchase managing unit 330 may be omitted. For example, the character attribute information extraction item may be a free item, and when the character attribute information extraction item is the free item, the game server may not confirm whether the user holds the character attribute information extraction item.

In the game server 110 according to the exemplary embodiment of the present invention, the character releasing unit 310 may confirm at least one of level information on the first character and information on whether a character attribute information extraction item is held and control whether the character attribute information on the first character is extractable depending on the confirmed result. For example, the character releasing unit 310 may allow the character attribute information on the first character to be extracted only when a level of the first character is higher than a predetermined level. Further, the character releasing unit 310 may allow the character attribute information on the first character to be extracted only when the level of the first character is within a predetermined level range. According to another exemplary embodiment of the present invention, the character releasing unit 310 may search whether the user hold the character attribute information extraction item and allow the character attribute information to be extracted only when the user holds the character attribute information extraction item.

In the game server 110 according to the exemplary embodiment of the present invention, the character releasing unit 310 may control whether the character attribute information on the first character is extractable depending on a game progress frequency (for example, the number of matches in which the first character participates in the case of a sports game) of the first character. For example, when the game is a sports game, the character releasing unit 310 may allow the character attribute information on the first character to be extracted only when the number of matches in which the first character participates exceeds a preset value (for example, 100 matches).

In the game server 110 according to the exemplary embodiment of the present invention, the character releasing unit 310 may limit the number of characters of which the character attribute information is extractable to a preset number or limit the character attribute information extraction frequency to a preset frequency.

In the game server 110 according to the exemplary embodiment of the present invention, the character releasing unit 310 may generate the transfer character attribute information based on a rearing level, which is determined based on a difference between a level before the rearing and a final level of the first character, and required character attribute information required to increase levels for each of the plurality of stat sections.

In more detail, the character releasing unit 310 refers to the required character attribute information required to increase the levels for each stat section to confirm the level before the rearing and the stat of the first character and the final level and the stat of the first character when the first character is released, calculates an average value of the character attribute information required to rear the first character from the level before the rearing of the first character to the final level thereof, and multiplies the rearing level (=final level–level before rearing) by the calculated average value, thereby calculating and generating the transfer character attribute information.

Meanwhile, the character releasing unit 310 refers to the character attribute information (experience value) required for each level to calculate the character attribute information required to increase the level of the first character to be released from the level before the rearing (for example, level when the first character is acquired) to the final level (level when the first character is released) or the average value of the character attribute information and multiplies the rearing level (=final level–level before rearing) by the calculated character attribute information or the average value therefor, thereby calculating and generating the transfer character attribute information.

When the first character is a character acquired through a card item and is a character having a specific level of a predetermined level or more, the above-mentioned character releasing unit 310 may determine the specific level as the rearing level.

For example, the character releasing unit 310 determines whether the character is a character acquired through the card item at the time of being first generated, and determines whether the final level is a preset level or more when the transfer character attribute information is extracted. If it is determined that the character is a character acquired through the card item and the final level is a preset level or more, the character releasing unit 310 considers the final level as the rearing level, and as described above, may generate the transfer character attribute information based on the required character attribute information required to increase the rearing level and the levels for each of the plurality of stat sections.

The above-mentioned character releasing unit 310 may generate a part or the whole of the character attribute information 230 on the first character as the transfer character attribute information 250. For example, the character releasing unit 310 may extract only the value corresponding to 70% to 50% of the character attribute information 250 on the first character as the transfer character attribute information 250.

The above-mentioned character releasing unit 310 may record a generation time when the transfer character attribute information 250 is generated, and delete the transfer character attribute information 250 when a preset transfer validity date from the generation time lapses. For example, the character releasing unit 310 may generate the transfer character attribute information 250 based on the character attribute information 230 on the first character and record the generation time in the database. After the transfer character attribute information is generated, the character releasing unit 310 may determine whether the previously generated transfer character attribute information 250 is present through a periodic search and determine whether the generation time is within a preset transfer validity date. When the transfer character attribute information 250 is previously generated and the generation time exceeds the preset transfer validity date, the character releasing unit 310 may delete the transfer character attribute information 250.

In the game server 110 according to the exemplary embodiment of the present invention, the character attribute information transferring unit 320 may record an update time when the character attribute information 240 on the second character is updated, and the character releasing unit 310 may limit the extraction of the character attribute information 230 on the first character for a preset extraction limitation period from the update time in accordance with the transfer releasing request information.

An example of the character releasing unit of the game server 110 according to the exemplary embodiment of the present invention will be described with reference to FIGS. 5 to 7 based on the character attribute information of FIG. 4.

FIG. 4 is a diagram for describing character attribute information on characters in the game according to an exemplary embodiment of the present invention.

In FIG. 4, the character attribute information includes items such as a name, an experience value, a level, a stat, a generation time, a level at the time of generation, and a stat at the time of generation. The name is a nickname given for a user to easily recognize characters. The experience value is a term used in the game to grow characters, and when the user performs a mission (for example, capturing a monster in a role playing game or performing a match in a sports game), the experience values are increased, and when experience values having a predetermined number are gathered, the levels of the characters are increased. The level is a value obtained by dividing and representing the experience values accumulated by the characters into a section and may allow the accumulated experience values of the characters to be easily estimated. Further, there is a case in which a mission, which only the character having a predetermined level or more may perform, may be separately grouped by forming several limitation conditions in the game based on the level value. The stat means a degree of force which may cope with work, and a concept of offline abilities (strength, speed, and the like) may correspond to the stat on the game or the state may be set for virtual abilities particularly required on the game. The generation time represents the time when the character is first generated in the game. The level at the time of generation means a character level when the character is first generated, and may be information required to calculate only the level (rearing level) value increased after the character is generated. The stat at the time of generation is a character stat value when the character is first generated.

Figure 5:
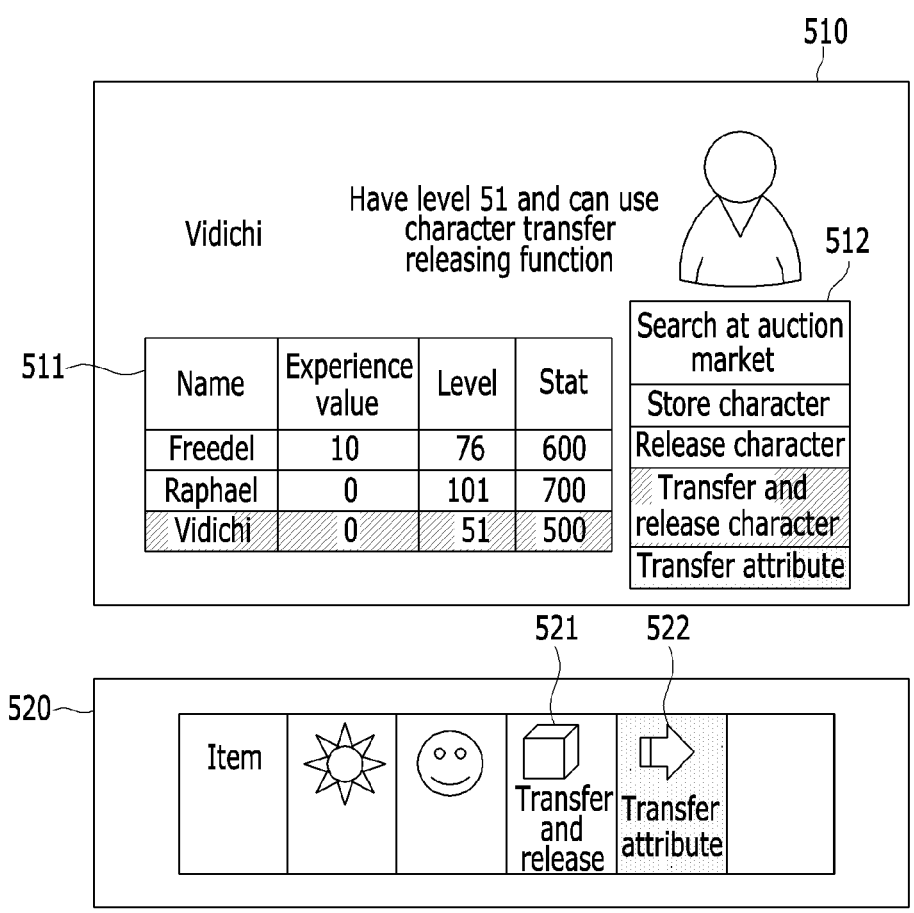
FIG. 5 is a diagram illustrating a user interface in which a function of releasing characters is activated, in the game according to an exemplary embodiment of the present invention.

FIG. 5 is a diagram illustrating a user interface in which a character releasing function is activated, in the game according to an exemplary embodiment of the present invention.

In the game according to the exemplary embodiment of the present invention, the user sees a user interface 510, which may select the character, through the terminal 120. As illustrated in FIG. 5 as an example, the user interface 510 which may select the character may include a character list 511 which is listed in a table form along with the character name. When the user selects the characters in the user interface, game items which may be applied to the selected characters are activated. In FIG. 5, the applicable items are illustrated in a menu form 512. The applicable items may be illustrated in an icon form and in FIG. 5, an icon form is illustrated together. The user selects characters from the character list table 511 of the user interface 510 which may select characters, and selects a character transfer releasing menu (character attribute information extraction item menu) from the applicable game item menu 512, or clicks a character attribute information extraction item (transfer releasing item) icon 521 in an applicable game item icon collage 520, thereby transmitting the transfer releasing request information to the character releasing unit 310. The attribute transfer menu in the menu form and an attribute transfer item icon 522 in the icon collage 520 are initially deactivated in the user interface 510, but may be activated in the case in which the transfer character attribute information 250 is generated.

Contents controlled by the character releasing unit 310 will be described using a flow chart of FIG. 6 and an example of data of FIG. 7 in accordance with the transfer releasing request information.

Figure 6:
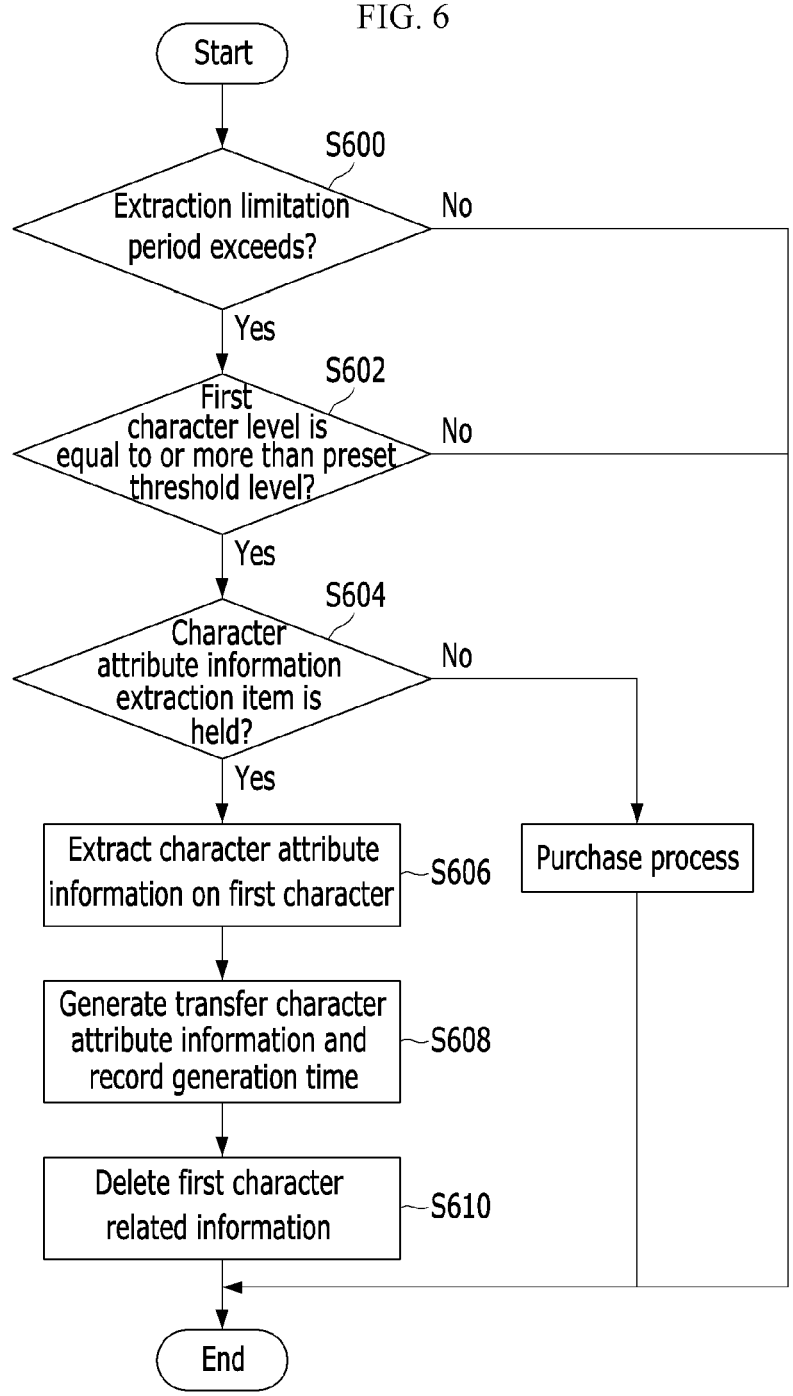
FIG. 6 is a flow chart of a process of generating transfer character attribute information from character attribute information on a first character, in the game according to the exemplary embodiment of the present invention.

FIG. 6 is a flow chart of a process of generating the transfer character attribute information 250 from the character attribute information 230 on the first character, in the game according to the exemplary embodiment of the present invention. FIG. 7 is a diagram illustrating an example of data for describing the process of FIG. 6.

As described above, when the transfer releasing request information is received, the character releasing unit 310 determines whether the time when the transfer releasing request information is received exceeds the extraction limitation period, according to a command of the user (S600). The character attribute information transferring unit 320 refers to the transfer character attribute information 250 to update the character attribute information 240 on the second character stored in the database 340 and records the update time in the database 340, in accordance with the attribute transfer request information. When the time when the transfer releasing request information is received is within the extraction limitation period from the update time (NO in S600), the character releasing unit 310 ends the process without extracting the character attribute information on the first character.

When the time when the transfer releasing request information is received exceeds the extraction limitation period (YES in S600), the character releasing unit 310 determines whether the level of the first character selected for transfer releasing is equal to or more than a preset threshold level (S602). When the level of the first character is equal to or more than the preset threshold level (YES in S602), the character releasing unit 310 determines whether the user holds the character attribute information extraction item (S604). When the user does not hold the character attribute information extraction item (YES in S604), the character releasing unit 310 performs the purchase process of the character attribute information extraction item and updates the holding information of the character attribute information extraction item according to the purchase result. When the user holds the character attribute information extraction item (YES in S604), the character releasing unit 310 extracts the character attribute information 230 on the first character (S606) and generates the transfer character attribute information (S608). Further, the character releasing unit 310 records the time when the transfer character attribute information 250 is generated in the database (S608) and deletes the first character 210 related information from the database 340 (S610).

A process of extracting, by the character releasing unit 310 according to the exemplary embodiment of the present invention, the character attribute information 230 on the first character (S606) and generating the transfer character attribute information 250 (S608) will be described in detail based on the data of FIG. 7.

A first character attribute information table 710 represents character attribute information on a character having a name called Vidichi, and a required experience value table 720 for increasing a level represents an experience value required to increase the level as much as one step depending on the stat section. A transfer character attribute information table 730 stores the result value of the transfer character attribute information extracted through the first character attribute information table 710.

Referring to the first character attribute information table 710 of FIG. 7 according to the exemplary embodiment of the present invention, the first character is generated with first level 1 and is grown to current level 51 which is a final time. When the experience values of the transfer character attribute information 730 are generated by extracting the experience values accumulated from the first generation to the final time, the accumulated experience value information is not stored in the first character attribute information and is divided into the level information and the experience values, and therefore the accumulated experience values need to be estimated using the values (experience values and level) and the stat value as auxiliary information.

In the game according to the exemplary embodiment of the present invention, when it is assumed that a predetermined experience value is required to increase the levels of the characters and the required experience values to increase the levels are set differently depending on the stat section, for example, even though two different characters are at the same level 1, if a stat of any one character (hereinafter, character A) is 330 and a state of the other character (hereinafter, character B) is 360, character A requires an experience value of 650 to increase a level as much as one step and character B requires an experience value of 700 to increase a level as much as one step, when referring to the table 720 for the required experience values to increase levels. To the contrary, when both the characters are currently grown to level 2, character A accumulates the experience value of 650 and character B accumulates the experience value of 700.

Performing the determination according to the exemplary embodiment of the present invention of the above-mentioned method, the first character (Vidichi) satisfies different required experience values depending on the stats in each level while the level is increased as much as 50 steps. However, for the reason why the history is not stored, an equation to estimate approximation values of the accumulated experience values is required.

An example of the equation to estimate the approximation values of the accumulated experience values is as follows. An average value of the required experience values to increase the level from an initial stat section to a final stat section is obtained and the approximation value of the accumulated experience values is obtained by multiplying a difference (hereinafter, rearing level) between the level at the first generation time and the level at the final time by the average value.

Applying the data of FIG. 7, the stat at the final generation time is 300 and the required experience value is 650. The stat at the final time is 500 and the required experience value is 850. Obtaining the average value of the required experience values to increase the levels from the initial stat section to the final stat section, the average value becomes (650+700+750+800+850)÷5=750. Since the level (level before rearing) at the first generation time is 1 and the level (final level) at the final time is 51, the rearing level becomes 50. 37,500, which is an approximation value of the accumulated experience value of the first character, is obtained by multiplying the rearing level by the average value 750 of the required experience values. The character releasing unit 310 may store all or a part of the approximation value of the accumulated experience value of the first character as the accumulated experience values as the transfer character attribute information 730. For example, 100%, 70%, or 50% of 37,500, which are the approximation values of the accumulated experience values of the first character, may be stored as the accumulated experience values as the transfer character attribute information 730, and when 50% is stored, the accumulated experience value of 37,500×0.5=18,750 may be stored as the transfer character attribute information 730.

According to another exemplary embodiment of the present invention, the transfer character attribute information may be obtained using 50% of the required experience value to increase the levels for each stat section. Since the required experience value of the initial stat section is 650, the experience value of 50% is 650×0.5=325. Similarly, 50% of the required experience value of the final stat section is 850×0.5=425, and when the average value of the 50% experience values of the required experience value to increase the level from the initial stat section to the final stat section is obtained, the accumulated experience value as the transfer character attribute information 730, which is (650×0.5+700×0.5+750×0.5+800×0.5+850×0.5)=18,750, may be obtained.

In the exemplary embodiment illustrated in FIG. 7, the accumulated experience value is finally stored as the transfer character attribute information.

The method of generating the transfer character attribute information depending on calculating the approximation values of the accumulated experience values may be omitted when the game server manages the accumulated experience values using the character attribute information on the first character.

An example of the character attribute information transferring unit of the game server 110 according to the exemplary embodiment of the present invention will be described with reference to FIGS. 8 to 10 based on the character attribute information of FIG. 4.

Figure 8:
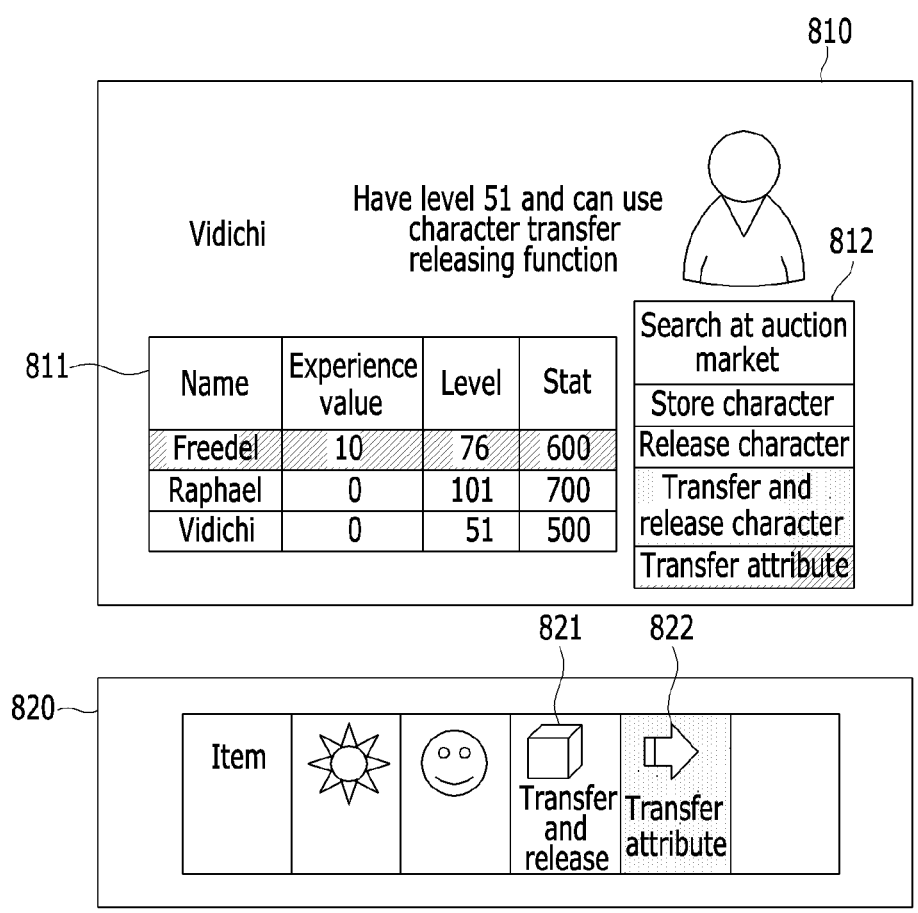
FIG. 8 is a diagram illustrating a user interface in which a function of transferring character attribute information is activated, in the game according to an exemplary embodiment of the present invention

FIG. 8 is a diagram illustrating a user interface in which a function of transferring character attribute information is activated, in the game according to an exemplary embodiment of the present invention.

In the game according to the exemplary embodiment of the present invention, the user sees a user interface 810, which may select the character, through the terminal 120. As illustrated in FIG. 8 as an example, the user interface 810 which may select the character may include a character list 811 which is listed in a table form along with the character name. When the user selects the characters in the interface, game items which may be applied to the selected characters are activated. In FIG. 8, the applicable items are illustrated in a menu form 812. The applicable items may be illustrated in an icon form and in FIG. 8, an icon form 820 is illustrated together. The user selects the characters from the character list table 811 of the user interface 810 which may select the characters, and selects the attribute transfer menu from the applicable game item menu 812, or clicks an attribute transfer item icon 822 in the applicable game item icon collage 820, thereby transmitting the attribute transfer request information to the character attribute information transferring unit 310.

Further, as described above, the character releasing unit 310 may limit the number of characters of which the character attribute information may be extracted to a preset number or limit the character attribute information extraction frequency to a preset frequency. As described above, when the extraction of the character attribute information is limited, the transfer releasing menu in the menu form and an transfer releasing item icon 821 in the icon college 820 may be deactivated in the user interface 810.

Contents controlled by the character attribute information transferring unit 320 will be described using a flow chart of FIG. 9 and an example of data of FIG. 10 in accordance with the attribute transfer request information.

Figure 9:
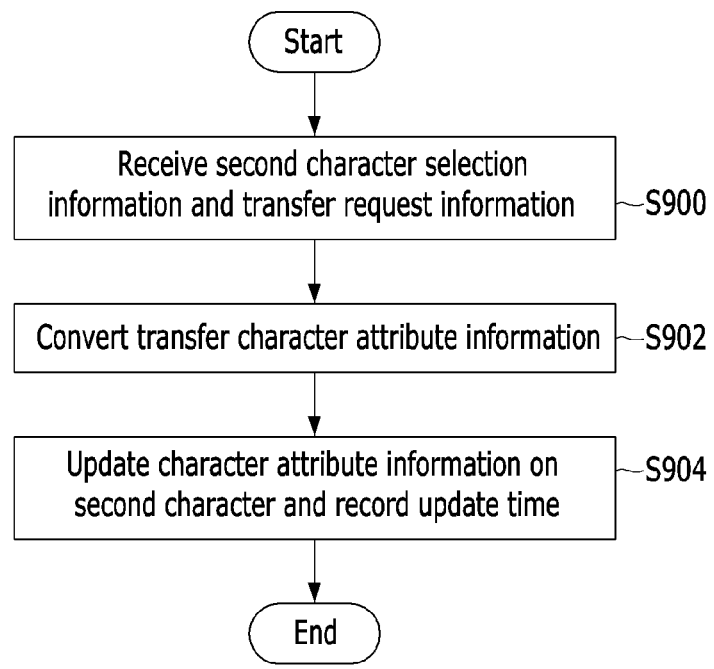
FIG. 9 is a flow chart of a process of updating character attribute information on a second character by referring to the transfer character attribute information, in the game according to an exemplary embodiment of the present invention.

FIG. 9 is a flow chart of a process of updating the character attribute information 240 on the second character by referring to the transfer character attribute information 250, in the game according to an exemplary embodiment of the present invention. FIG. 10 is a diagram illustrating an example of data for describing the process of FIG. 9.

The character attribute information transferring unit 320 receives a second character selection information and a transfer request from the game server 110 (S900). The character attribute information transferring unit 320 converts the transfer character attribute information 250 to add the transfer character attribute information 250 stored in the database 340 to the character attribute information 240 on the second character (S902). The character attribute information transferring unit 320 updates the character attribute information 240 on the second character by referring to the converted transfer character attribute information, and stores the update time in the database 340.

A process of converting, by the character attribute information transferring unit 250 according to the exemplary embodiment of the present invention, the transfer character attribute information 250 stored in the database 340 and updating the character attribute information 240 on the second character by referring to the transfer character attribute information 250 will be described in detail using the data illustrated in FIGS. 7 and 10.

Referring to FIG. 7, the transfer character attribute information extracted from the first character attribute information is 18,750. The data are stored in the accumulated experience value form and therefore a process of converting the data into the experienced values and the levels, which are a form of the character attribute information on the second character, is required.

In the game according to the exemplary embodiment of the present invention, when it is assumed that a predetermined experience value is required to increase the levels of the characters and the required experience values to increase the levels are set differently depending on the stat section, a required experience value table 1020 for each level of FIG. 10 shows the required experience values for each level of Freedel, which is the second character, depending on a current stat.

A sum of the required experience values from level 76 to level 93, which are the current level of the second character, is 950+960+970+980+990+1000+1010+1020+1030+1040+1050+1060+1070+1080+1090+1100+1110+1120=18,630, and when the level is updated to the accumulated experience value 18, 750 stored in the transfer character attribute information, the level of the second character is increased to level 94, and an extra experience value 120 is summed with a current experience value 10 of the second character and is updated, and therefore the experience value becomes 130.

Figure 11:
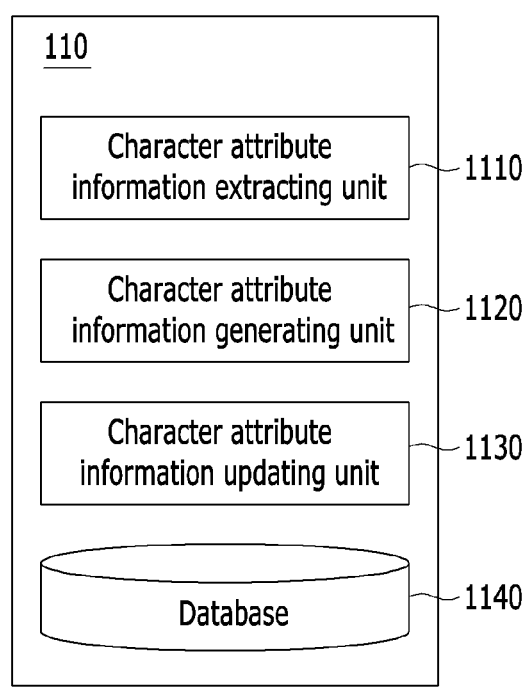
FIG. 11 is a block diagram of a game server according to an exemplary embodiment of the present invention.

FIG. 11 is a block diagram of a game server according to an exemplary embodiment of the present invention.

As illustrated in FIG. 11, the game server 11, which is the function of transferring character attribute information in the game according to the exemplary embodiment of the present invention, may include: a character attribute information extracting unit 1110 configured to extract the character attribute information on the first character from the database; a transfer character attribute information generating unit 1120 configured to generate the transfer character attribute information based on the extracted character attribute information on the first character; a character attribute information updating unit 1130 configured to update the character attribute information on the second character in the database by referring to the transfer character attribute information, a database 1140 configured to store the character attribute information, and the like.

Figure 12:
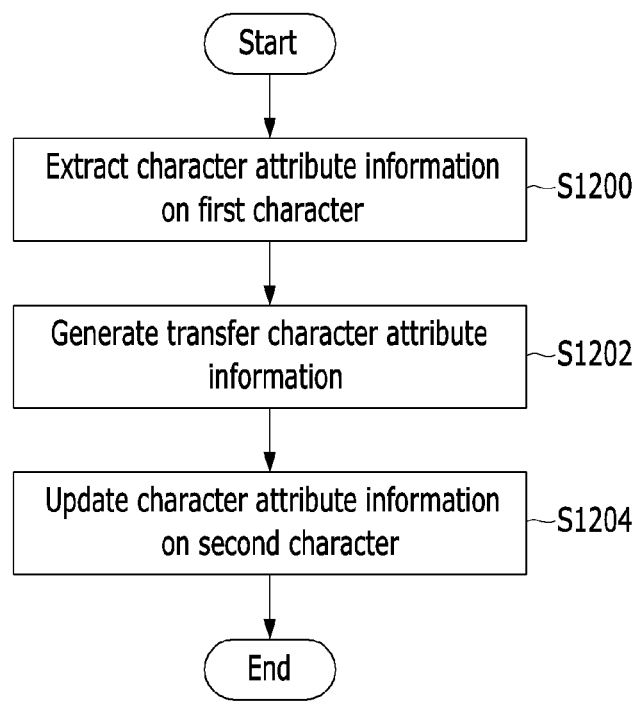
FIG. 12 is a flow chart of a game method according to an exemplary embodiment of the present invention.

FIG. 12 is a flow chart of the game method according to an exemplary embodiment of the present invention.

A method for providing a game by the server 10 according to the exemplary embodiment of the present invention may include: extracting the character attribute information on the first character from the database 1140 (S1200); generating the transfer character attribute information based on the extracted character attribute information on the first character (S1202); and updating the character attribute information on the second character in the database 1140 by referring to the transfer character attribute information (S1204), and the like.

The function of transferring character attribute information in the game according to the above-mentioned exemplary embodiment of the present invention is performed by the terminal 120 or the game server 110 by interworking with the applications in the terminal 120, but may be performed by the terminal 120 or the applications in the terminal 120, by not interworking with the game server 110 or by interworking with only a part of the function of the server 110.

Figure 13:
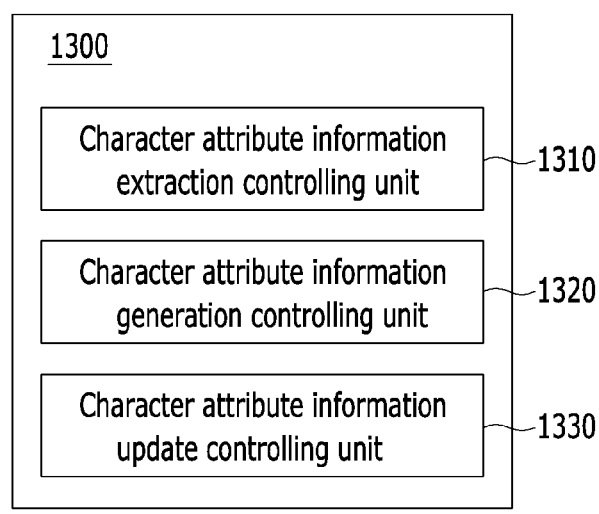
FIG. 13 is a block diagram of a terminal according to an exemplary embodiment of the present invention.

FIG. 13 is a block diagram of a terminal according to an exemplary embodiment of the present invention.

Referring to FIG. 13, the terminal for providing a function of transferring character attribute information in the game according to the exemplary embodiment of the present invention may include: a character attribute information extraction controlling unit 1310 configured to perform a control to extract the character attribute information on the first character; a transfer character attribute information generation controlling unit 1320 configured to perform a control to generate the transfer character attribute information based on the extracted character attribute information on the first character; and a character attribute information update controlling unit 1330 configured to perform a control to update the character attribute information on the second character by referring to the transfer character attribute information.

The transfer character attribute information generation controlling unit 1320 may generate a part or the whole of the character attribute information on the first character as the transfer character attribute information.

Figure 14:
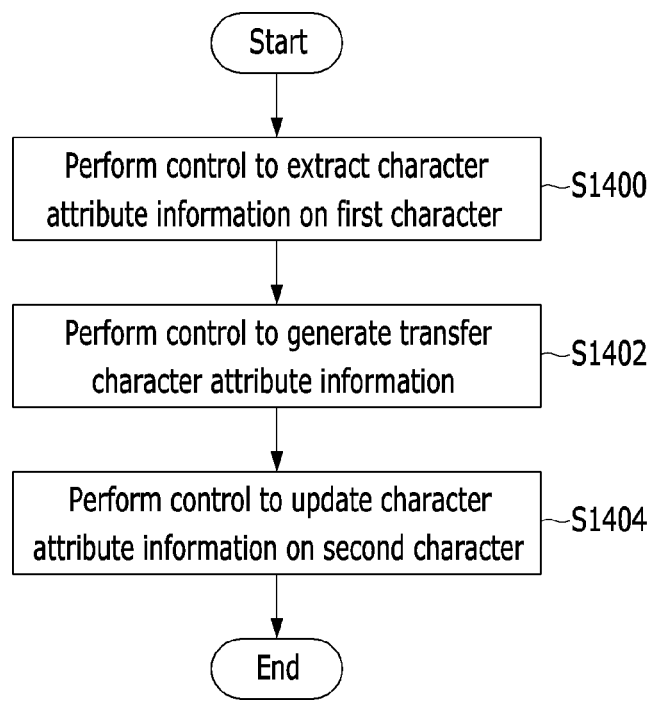
FIG. 14 is a flow chart of the game method according to an exemplary embodiment of the present invention.

FIG. 14 is a flow chart of the game method according to an exemplary embodiment of the present invention.

A method for providing a game by the terminal 120 according to the exemplary embodiment of the present invention may include: performing a control to extract the character attribute information on the first character (S1400); performing a control to generate the transfer character attribute information based on the extracted character attribute information on the first character (S1402); performing a control to update the character attribute information on the second character by referring to the transfer character attribute information (S1404), and the like.

The method for providing the function of transferring character attribute information in the game according to the exemplary embodiment of the present invention as described above may be executed by the applications basically installed in the terminal (including programs included in a platform, an operating system, or the like which are basically installed in the terminal), and may also be executed by the applications (i.e., programs) which are directly installed in the terminal by the user via an application store server or an application store server such as a web server associated with the applications or the corresponding services.

In this respect, the method for providing the function of transferring character attribute information in the game according to the exemplary embodiment of the present invention may be implemented by the applications (i.e., programs) which are basically installed or directly installed by the user in the terminal and may be recorded in a computer readable recording medium of the terminal, and the like.

The program implementing the method for providing the function of transferring character attribute information in the game according to the exemplary embodiment of the present invention executes the function of performing a control to extract the character attribute information on the first character, the function of performing a control to generate the transfer character attribute information based on the extracted character attribute information on the first character, and the function of performing a control to update the character attribute information on the second character by referring to the transfer character attribute information.

The programs are recorded in the computer readable recording medium and are executed by the computer, such that the above-mentioned functions may be executed.

As described above, in order for the computer to read the programs recorded in the recording medium and execute the method for providing the function of transferring character attribute information in the game implemented by the programs, the above-mentioned programs may include codes which are coded with computer languages such as C, C++, JAVA, machine language, and the like which may be read by a processor (CPU) of the computer.

The code may include a function code associated with a function of defining the above-mentioned functions and may also include an execution procedure related control code required for the processor of the computer to execute the above-mentioned functions according to a predetermined procedure.

Further, the code may further include a memory reference related code indicating at which location (address number) of the memory inside or outside the computer additional information or media required for the processor of the computer to execute the above-mentioned functions need to be referenced.

Further, in order for the processor of the computer to execute the above-mentioned functions, when the processor needs to communicate with any other computers or servers, etc. at a remote location, the code may further include a communication related code about how the processor of the computer communicates with any other computers or servers at a remote location or which information or media the processor of the computer transmits and receives at the time of the communication, by using the communication module (for example, wired and/or wireless communication module) of the computer.

Further, a functional program for implementing the present invention, a code and a code segment associated therewith, and the like may be easily inferred or changed by programmers in the art to which the present invention pertains in consideration of a system environment of the computer which reads the recording medium and executes the program.

Hereinabove, examples of a computer readable recording medium recorded with programs as described above include a ROM, a RAM, a CD-ROM, a magnetic tape, a floppy disk, an optical media storage device, and the like.

Further, a computer readable recording medium recorded with programs as described above may be distributed to a computer system connected through a network and thus store and execute a computer readable code by a distributed manner. In this case, at least one computer among a plurality of distributed computers may execute a part of the above-mentioned functions and transmit the executed results to at least one of the other distributed computers, and the computer receiving the result may also execute a part of the above-mentioned functions and provide the executed results to the other distributed computers.

In particular, a computer readable recording medium recorded with applications, which are programs for executing the method for providing the function of transferring character attribute information in the game according to the exemplary embodiment of the present invention, may be a storage medium (for example, hard disk, and the like) included in an application store server or an application providing server such as a web server associated with applications or corresponding services, and the like, or the application providing server itself.

A computer, which may read a recording medium recorded with applications that are programs for executing the method for providing the function of transferring character attribute information in the game according to the exemplary embodiment of the present invention, may include not only a general PC such as a typical desktop and a laptop but also a mobile terminal such as a smart phone, a tablet PC, personal digital assistants (PDAs), and a mobile communication terminal, and is to be construed as all the computable devices.

When a computer, which may read a recording medium recorded with applications that are programs for executing the method for providing the function of transferring character attribute information in the game according to the exemplary embodiment of the present invention, is a mobile terminal such as a smart phone, a tablet PC, a personal digital assistant (PDA), and a mobile communication terminal, the applications are downloaded from an application providing server to a general PC and thus may also be installed in the mobile terminal through a synchronization program.

As set forth above, according to the exemplary embodiments of the present invention, it is possible to more inspire the user's interest in a game by providing the function of transferring character attribute information of one character, which is grown in the game by the user, as the character attribute information of another character.

Hereinabove, although it has been mentioned that all components configuring the exemplary embodiment of the present invention described hereinabove are combined with each other as one component or are combined and operated with each other as one component, the present invention is not necessarily limited to the above-mentioned exemplary embodiment. That is, all the components may also be selectively combined and operated with each other as one or more component without departing from the scope of the present invention. In addition, although each of all the components may be implemented by one independent hardware, some or all of the respective components which are selectively combined with each other may be implemented by a computer program having a program module performing some or all of functions combined with each other in one or plural hardware. The codes and the code segments configuring the computer program may be easily inferred by a person having ordinary skill in the art to which the present invention pertains. The computer programs are stored in the computer readable media and are read and executed by the computer and may implement the exemplary embodiment of the present invention. As the storage medium of the computer programs, a magnetic recording medium, an optical recording medium, and the like may be used.

Further, it will be further understood that the terms "comprises" or "have" used in this specification may include the corresponding components unless explicitly described to the contrary and therefore, do not preclude other components but further include the components. In addition, unless defined otherwise in the detailed description, all the terms including technical and scientific terms have the same meaning as meanings generally understood by those skilled in the art to which the present invention pertains. Generally used terms such as terms defined in a dictionary should be interpreted as the same meanings as meanings within a context of the related art and should not be interpreted as ideally or excessively formal meanings unless clearly defined in the present specification.

The spirit of the present invention has been just exemplified. It will be appreciated by those skilled in the art that various modifications and alterations can be made without departing from the essential characteristics of the present invention. Accordingly, the exemplary embodiments disclosed in the present invention do not limit but describe the spirit of the present invention, and the scope of the present invention is not limited by the exemplary embodiments. The scope of the present invention should be interpreted by the following claims and it should be interpreted that all spirits equivalent to the following claims fall within the scope of the present invention.

The invention claimed is:

1. A game server, comprising:
a character releasing unit configured to, in response to transfer releasing request information:
extract, from a database, character attribute information on a first character;
determine a rearing level of the first character based on a difference between an initial level of the first character and a current level of the first character, the initial level and the current level being included in the extracted character attribute information on the first character;
generate transfer character attribute information based on the determined rearing level and required character attribute information that is required to increase a level for each of stat sections of the first character; and
delete, in the database, first character related information comprising the character attribute information on the first character;
a character attribute information transferring unit configured to update, in the database, character attribute information on a second character based on the transfer character attribute information, in response to attribute transfer request information,
wherein the character releasing unit is further configured to:
confirm at least one among the current level of the first character and whether a character attribute information extraction item is held; and
extract, from the database, the character attribute information on the first character in response to the confirmation; and
an item purchase managing unit configured to:
perform a process of purchasing the character attribute information extraction item in response to the confirmation that the character attribute information extraction item is not held; and
update holding information on the character attribute information extraction item in response to the purchase.

2. The game server of claim 1, wherein the character releasing unit is further configured to limit a number of characters of which the character attribute information is extractable to a preset number, or limit a character attribute information extraction frequency to a preset frequency.

3. The game server of claim 1, wherein the character releasing unit is further configured to determine the rearing level in response to the first character being acquired through a card item and having the current level of a predetermined level or more.

4. The game server of claim 1, wherein the character releasing unit is further configured to generate a part or the whole of the extracted character attribute information on the first character as the transfer character attribute information.

5. The game server of claim 1, wherein the character releasing unit is further configured to:
record a generation time when the transfer character attribute information is generated; and
delete the transfer character attribute information when a preset transfer validity date from the generation time lapses.

6. The game server of claim 1, wherein the character attribute information transferring unit is further configured to record an update time when the character attribute information on the second character is updated, and
wherein the character releasing unit is further configured to limit the extraction of the character attribute information on the first character for a preset extraction limitation period from the update time, in response to the transfer releasing request information.

7. A game server, comprising:
a character attribute information extracting unit configured to extract, from a database, character attribute information on a first character;
a transfer character attribute information generating unit configured to:
determine a rearing level of the first character based on a difference between an initial level of the first character and a current level of the first character, the initial level and the current level being included in the extracted character attribute information on the first character; and
generate transfer character attribute information based on the determined rearing level and required character attribute information that is required to increase a level for each of stat sections of the first character; and
a character attribute information updating unit configured to:
update, in the database, character attribute information on a second character based on the transfer character attribute information; and
record an update time when the character attribute information on the second character is updated,
wherein the character attribute information extracting unit is further configured to limit the extraction of the character attribute information on the first character for a preset extraction limitation period from the update time.

8. A method for providing a game by a server, the method comprising:
- extracting, from a database, character attribute information on a first character;
- determining a rearing level of the first character based on a difference between an initial level of the first character and a current level of the first character, the initial level and the current level being included in the extracted character attribute information on the first character;
- generating transfer character attribute information based on the determined rearing level and required character attribute information that is required to increase a level for each of stat sections of the first character;
- updating, in the database, character attribute information on a second character based on the transfer character attribute information;
- recording an update time when the character attribute information on the second character is updated; and
- limiting the extraction of the character attribute information on the first character for a preset extraction limitation period from the update time.

9. A method for providing a game by a server, the method comprising:
- confirming character attribute information on a first character among holding characters;
- determining a rearing level of the first character based on a difference between an initial level of the first character and a current level of the first character, the initial level and the current level being included in the confirmed character attribute information on the first character;
- generating transfer character attribute information based on the determined rearing level and required character attribute information that is required to increase a level for each of stat sections of the first character;
- updating character attribute information on a second character among the holding characters based on the transfer character attribute information;
- determining an average value of the required character attribute information that is required to increase the level for each of the stat sections from an initial stat section to a current stat section, the initial stat section and the current stat section being included in the confirmed character attribute information on the first character; and
- generating an accumulated experience value based on a multiplication of the determined average value by the determined rearing level.

10. A terminal, comprising:
- a character attribute information extraction controlling unit configured to perform a control to extract a character attribute information on a first character;
- a transfer character attribute information generation controlling unit configured to perform a control to:
  - determine a rearing level of the first character based on a difference between an initial level of the first character and a current level of the first character, the initial level and the current level being included in the extracted character attribute information on the first character;
  - generate transfer character attribute information based on the determined rearing level and required character attribute information that is required to increase a level for each of stat sections of the first character; and
- a character attribute information update controlling unit configured to:
  - perform a control to update character attribute information on a second character based on the transfer character attribute information; and
  - record an update time when the character attribute information on the second character is updated,
- wherein the character attribute information extraction controlling unit is further configured to limit the extraction of the character attribute information on the first character for a preset extraction limitation period from the update time.

11. The terminal of claim 10, wherein the transfer character attribute information generation controlling unit is further configured to perform a control to generate a part or the whole of the extracted character attribute information on the first character as the transfer character attribute information.

12. A method for providing a game by a terminal, comprising:
- performing a control to extract character attribute information on a first character;
- performing a control to determine a rearing level of the first character based on a difference between an initial level of the first character and a current level of the first character, the initial level and the current level being included in the extracted character attribute information on the first character, and generate transfer character attribute information based on the determined rearing level and required character attribute information that is required to increase a level for each of stat sections of the first character;
- performing a control to update character attribute information on a second character based on the transfer character attribute information;
- recording an update time when the character attribute information on the second character is updated; and
- limiting the extraction of the character attribute information on the first character for a preset extraction limitation period from the update time.

13. A computer readable recording medium recorded with program for executing a method for providing a game, wherein the program implements a function of performing a control to:
- extract, from a database, character attribute information on a first character;
- determine a rearing level of the first character based on a difference between an initial level of the first character and a current level of the first character, the initial level and the current level being included in the extracted character attribute information on the first character;
- generate transfer character attribute information based on the determined rearing level and required character attribute information that is required to increase a level for each of stat sections of the first character;
- update, in the database, character attribute information on a second character based on the transfer character attribute information;
- recording an update time when the character attribute information on the second character is updated; and
- limiting the extraction of the character attribute information on the first character for a preset extraction limitation period from the update time.

14. The game server of claim 1, wherein the character releasing unit is further configured to:
- determine an average value of the required character attribute information that is required to increase the level for each of the stat sections from an initial stat section to a current stat section, the initial stat section and the current stat section being included in the extracted character attribute information on the first character; and
generate an accumulated experience value based on a multiplication of the determined average value by the determined rearing level.

* * * * *